(12) United States Patent
Chakravadhanula et al.

(10) Patent No.: US 8,296,703 B1
(45) Date of Patent: Oct. 23, 2012

(54) FAULT MODELING FOR STATE RETENTION LOGIC

(75) Inventors: Krishna Chakravadhanula, Vestal, NY (US); Steven L. Gregor, Owego, NY (US); Brion L. Keller, Binghamton, NY (US); Vivek Chickermane, Ithaca, NY (US)

(73) Assignee: Cadence Design Systems, Inc., San Jose, CA (US)

( * ) Notice: Subject to any disclaimer, the term of this patent is extended or adjusted under 35 U.S.C. 154(b) by 319 days.

(21) Appl. No.: 12/339,958

(22) Filed: Dec. 19, 2008

(51) Int. Cl.
*G06F 9/455* (2006.01)
*G06F 17/50* (2006.01)

(52) U.S. Cl. ......... 716/112; 716/106; 716/110; 716/111

(58) Field of Classification Search ................. 716/112
See application file for complete search history.

(56) References Cited

U.S. PATENT DOCUMENTS

| | | | |
|---|---|---|---|
| 5,390,193 A * | 2/1995 | Millman et al. ............... | 714/741 |
| 5,546,408 A | 8/1996 | Keller | |
| 6,775,180 B2 | 8/2004 | Biyani et al. | |
| 7,065,724 B2 * | 6/2006 | Caty et al. ..................... | 716/103 |
| 7,091,766 B2 | 8/2006 | Ko et al. | |
| 7,123,068 B1 | 10/2006 | Hoover et al. | |
| 7,138,842 B2 | 11/2006 | Padhye et al. | |
| 7,164,301 B2 | 1/2007 | Chun | |
| 7,183,825 B2 | 2/2007 | Padhye et al. | |
| 2007/0245277 A1* | 10/2007 | Chen ................................ | 716/5 |
| 2007/0245285 A1* | 10/2007 | Wang et al. .................... | 716/10 |
| 2008/0115024 A1* | 5/2008 | Wang et al. ................... | 714/731 |
| 2009/0326854 A1* | 12/2009 | Chakravadhanula et al. | 702/119 |

OTHER PUBLICATIONS

Bertazzoni et al., "Monitoring methodology for TID damaging of SDRAM devices based on retention time analysis", Oct. 10-13, 2004, Defect and Fault Tolerance in VLSI Systems, 2004. DFT 2004. Proceedings. 19th IEEE International Symposium on, pp. 106.*
Patrick Gallagher et al., U.S. Appl. No. 12/147,428, filed Jun. 26, 2008, 'Testing State Retention Logic in Low Power Systems'.

* cited by examiner

*Primary Examiner* — Paul Dinh
*Assistant Examiner* — Bryce Aisaka
(74) *Attorney, Agent, or Firm* — Schwegman Lundberg & Woessner, P.A.

(57) ABSTRACT

A method for modeling state-retention logic includes: specifying a circuit that includes an arrangement of circuit elements, wherein a portion of the circuit is organized into a power domain with a power-domain control for effecting power variations within the power domain, and the power domain includes a state-retention cell that includes a retention element with a retention-element control for saving state-retention-cell values in the retention element during power variations in the power domain; determining one or more pattern faults for detecting defects in state-retention operation of the circuit by associating circuit element values with values for the power-domain control or the retention-element control; and saving one or more values for the one or more pattern faults.

26 Claims, 14 Drawing Sheets

```
STATIC {
    REQUIRED      { list of <net/pin value> }           ← 302
    PROPAGATION   { net/pin = good_value/faulty_value }
}

DYNAMIC {
    INITIATION    { list of <net/pin value> }           ← 304
    REQUIRED      { list of <net/pin value> }
    PROPAGATION   { net/pin = good_value/faulty_value }
}
```

*FIG. 3*

```
DYNAMIC
{
    INIT {
        PIN Save_data 0
        PIN functional_flop.qpin 0          /*State to save*/
    }
    REQ {
        PIN Save_data 1                     /* Requires rising edge to happen on Save_data */
        PIN set/reset inactive_val          /*Deactivate set and reset pins, if present */
    }
    PROP {
        PIN retention_flop.qpin 0/1         /* Save logic-0 into retention flop */
    }
}
```

*FIG. 6*

```
STATIC
{
    REQ {
        PIN retention_flop.qpin 0              /* State to retain */
        PIN domain_power_signal off_val        /* Signal indicating domain is powered off */
    }
    PROP {
        PIN retention_flop.qpin 0/1            /* Retain logic-0 into retention flop */
    }
}
```

*FIG. 7*

```
REQ {
    PIN retention_flop.qpin 0        /* State to retain */
    VAR <signal_variable>            /* Variable that will be assigned later */
}
                        ↖ 802

PATTERN_FAULT_VAR <signal_variable> = "<PIN/NET> <power_signal_name> >off_val>"
                                              ↖ 804
```

FIG. 8

```
STATIC
{
  REQ {
    PIN Save_data 1                    /* Required for latch to be in flush state */
    PIN functional_flop.qpin 0         /* State to save* /
    PIN set/reset  inactive_val        /*Deactivate set and reset pins, if present */
  }
  PROP {
    PIN retention_latch.qpin 0/1       /* Save logic-0 into retention latch */
  }
}
```

FIG. 10

```
STATIC
{
    REQ {
        PIN retention_latch.qpin  0              /* State to retain */
        PIN domain_power_signal off_val          /* Signal indicating domain is powered off */
    }
    PROP {
        PIN retention_latch.qpin  0/1            /* Retain logic-0 into retention latch */
    }
}
```

FIG. 11

```
STATIC
{   REQ {
        PIN flop.qpin  0    /* State to save */
    }
    PROP {
        PIN flop.qpin  0/1  /* Save logic-0 into retention flop */
    }
}
```

*FIG. 13*

```
STATIC
{
    REQ {
        PIN flop.qpin 0                        /* State to retain */
        PIN domain_power_signal off_val        /* Signal indicating domain is powered off */
    }
    PROP {
        PIN flop.qpin 0/1                      /* Retain logic-0 into retention flop */
    }
}
```

*FIG. 14*

FAULT MODELING FOR STATE RETENTION LOGIC

BACKGROUND OF THE INVENTION

1. Field of Invention

The present invention relates to integrated circuits (ICs) generally and more particularly to low-power IC systems with state-retention logic.

2. Description of Related Art

IC Designs with multiple power domains are becoming increasingly common since power consumption can be reduced by temporarily powering off regions of the chip (called domains) that do not need to be active. Such designs have one or more switchable power domains and these domains can be powered off to eliminate both static and dynamic power dissipation in them. In order to ensure that the domain powers back on into a known state, switchable domains may include state retention cells (e.g., circuit elements that include retention elements for saving state values during power variations). Typically, state retention cells contain special flops or latches to retain the state of the cell when its main power supply is shut off. See, for example, U.S. Pat. Nos. 6,775,180, 7,091,766, 7,123,068, 7,164,301, 7,183,825, and 7,138,842, each of which is incorporated herein by reference in its entirety.

State retention cells, which are also called State Retention Power Gating or SRPG cells in some contexts, must be tested during manufacturing test to ensure that they are functioning correctly. An SRPG cell must be capable of retaining data when power is turned off to its enclosing domain, and the retained data must be observable once power is turned back on. In this context, a domain is considered switched off when the ambient voltage is lower than the operating voltage of the domain so that the ambient voltage does not necessarily have to be at 0V for the domain to be switched off.

However, the tests currently generated by Automatic Test Pattern Generation (ATPG) tools generally do not target the retention capabilities of the SRPG cells. In general, these tests target only structural defects (net stuck at logic-0 value, etc.) in the chip, and do not try to test the functional behavior of the logic including, for example, cycling of the power domains (e.g., turning them off and back on) containing the SRPG cells to see whether the cells are retaining state or not. See, for example, U.S. Pat. No. 7,065,724, which is incorporated herein by reference in its entirety.

Thus, there is a need for improved testing of ICs with retention elements for saving values during power variations related to the ICs.

SUMMARY OF THE INVENTION

In one embodiment of the present invention, a method for modeling state-retention logic includes: specifying a circuit that includes an arrangement of circuit elements, wherein a portion of the circuit is organized into a power domain with a power-domain control for effecting power variations within the power domain, and the power domain includes a state-retention cell that includes a retention element with a retention-element control for saving state-retention-cell values in the retention element during power variations in the power domain; determining one or more pattern faults for detecting defects in state-retention operation of the circuit by associating circuit element values with values for the power-domain control or the retention-element control; and saving one or more values for the one or more pattern faults. For example, one or more values for the pattern faults can be saved directly or through some related characterization in a computer-readable medium, including memory (e.g., RAM (Random Access Memory)) or permanent storage (e.g., a hard-disk system).

According to one aspect of this embodiment, the one or more pattern faults may include a static pattern fault that includes required circuit-element values for activating a defect and propagation circuit-element values for detecting a presence or absence of the defect.

According to another aspect, the one or more pattern faults may include a dynamic pattern fault that includes initial circuit-element values for initializing conditions for a defect, required circuit-element values for activating the defect and propagation circuit-element values for detecting a presence or absence of the defect.

According to another aspect, the one or more pattern faults may include a dynamic pattern fault for a defect corresponding to saving state-retention-cell values, where the dynamic pattern fault includes initial values for the state-retention cell and the retention-element control for initializing conditions for the defect, required values for the retention-element control for activating the defect, and propagation values for the retention element for detecting a presence or absence of the defect.

According to another aspect, the one or more pattern faults may include a static pattern fault for a defect corresponding to saving state-retention cell values, where the static pattern fault includes required values for the state-retention cell and the retention-element control for activating the defect, and propagation values for the retention element for detecting a presence or absence of the defect.

According to another aspect, the one or more pattern faults may include a static pattern fault for a defect corresponding to saving state-retention cell values, where the static pattern fault includes required values for the retention element for activating the defect, and propagation values for the retention element for detecting a presence or absence of the defect.

According to another aspect, the one or more pattern faults may include a static pattern fault for a defect corresponding to retaining state-retention-cell values, where the static pattern fault includes required values for the retention element and the power domain control for activating the defect, and propagation values for the retention element for detecting a presence or absence of the defect.

According to another aspect, the method may further include: associating keywords with the retention-element control and the power-domain control; and using the keywords to determine one or more additional pattern faults corresponding to replications of the retention element in a second power domain of the circuit having a corresponding second power-domain control.

According to another aspect, the method may further include: generating test patterns for testing the circuit; and using the one or more pattern faults to determine whether the test patterns are sufficient for detecting defects in state-retention operation of the circuit.

Additional embodiments relate to an apparatus for carrying out any one of the above-described methods, where the apparatus includes a computer for executing instructions related to the method. For example, the computer may include a processor with memory for executing at least some of the instructions. Additionally or alternatively the computer may include circuitry or other specialized hardware for executing at least some of the instructions. Additional embodiments also relate to a computer-readable medium that stores (e.g., tangibly embodies) a computer program for carrying out any one of the above-described methods with a computer.

In these ways the present invention enables improved testing of ICs with retention elements for saving values during power variations related to the ICs

BRIEF DESCRIPTION OF THE DRAWINGS

FIG. 3 shows exemplary syntax for a static pattern fault and a dynamic pattern fault.

FIG. 6 shows a dynamic pattern fault for modeling a save operation in the retention cell of FIG. 1 according to an embodiment of the present invention FIG. 7 shows a static pattern fault for modeling a retain operation in the retention cell of FIG. 1 according to an embodiment of the present invention FIG. 8 shows a rule (or syntax) for specifying pattern faults according to an embodiment of the present invention.

FIG. 10 shows a static pattern fault for modeling a save operation in the retention cell of FIG. 9 according to an embodiment of the present invention FIG. 11 shows static pattern fault for modeling a retain operation in the retention cell of FIG. 9 according to an embodiment of the present invention

FIG. 13 shows a static pattern fault for modeling a save operation in the retention cell of FIG. 12 according to an embodiment of the present invention FIG. 14 shows static pattern fault for modeling a retain operation in the retention cell of FIG. 12 according to an embodiment of the present invention

DETAILED DESCRIPTION OF EXEMPLARY EMBODIMENTS

Figure 1:
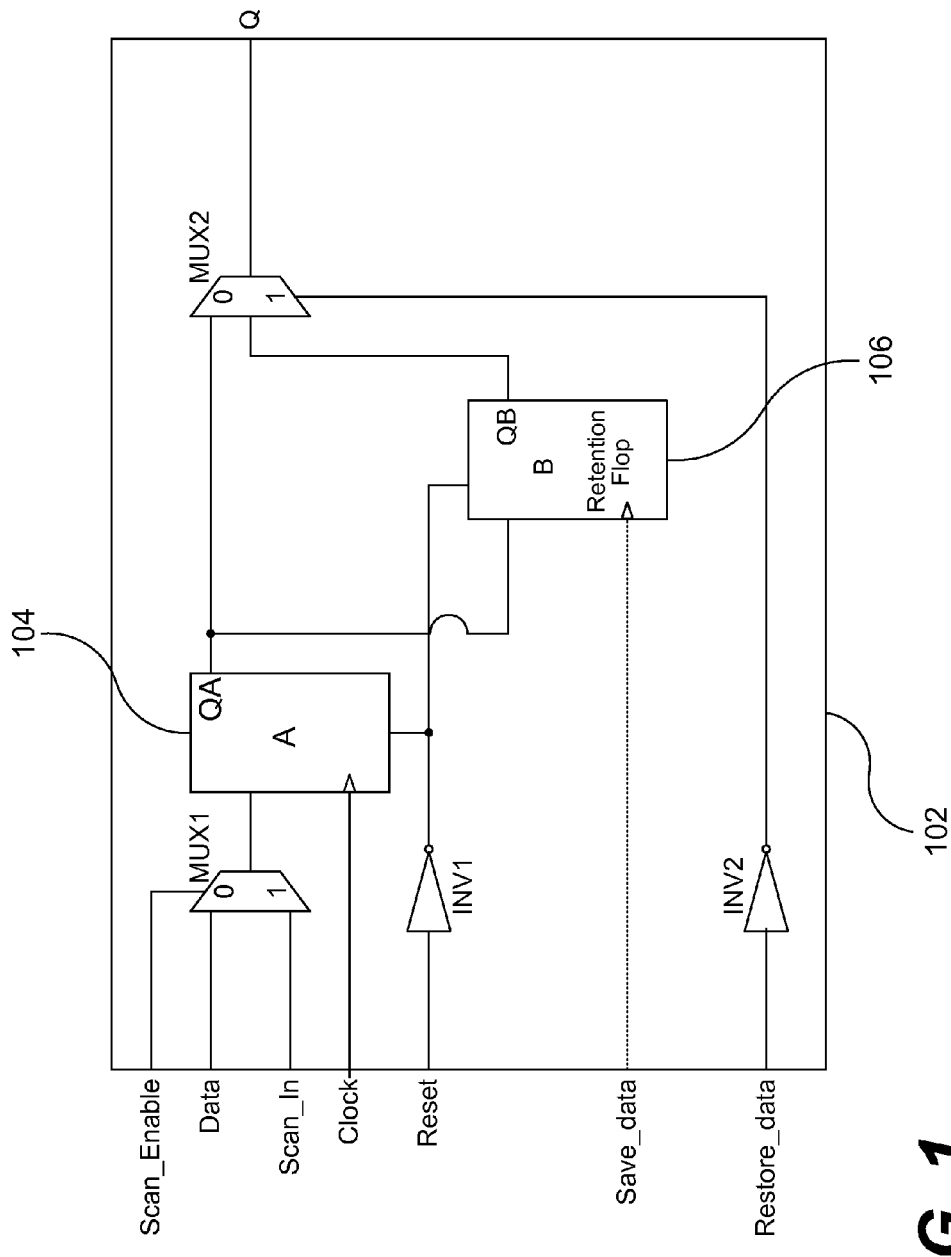
FIG. 1 shows an exemplary state retention cell (or SRPG cell) with two flops.

FIG. 1 shows an exemplary state retention cell (or SRPG cell) 102 that includes two flip-flops or "flops" (functional flop A 104 and retention flop B 106), two multiplexors (MUX1 and MUX2), and two inverters (INV1 and INV2). Multiplexor MUX1 controls whether Flop A gets data from the functional path (through pin Data) or from the previous flop in the scan chain (through pin Scan_In). When pin Scan_Enable is at logic-0 value, Flop A is on the functional path (Data-Q) and when Scan_Enable is at logic-1 value Flop A is on the scan path (Scan_In-Q). The Restore_data pin would typically be at logic-1 unless the value in Flop B needs to be made visible outside the retention cell.

Flop B 106 is the retention flop (or retention element) and is intended to hold state when the main power supply to the retention cell is shut off. Once Flop A 104 is loaded with an initial state either through the functional pin Data or through the scan pin Scan_In, the Save_data pin is pulsed to ensure the retention flop is loaded with the same state. After the save operation, the power to the parent domain can be turned off. When power is restored, Flop A may come back up in an unknown state. Therefore, the Restore_data pin needs to be at a low value for the stored state to be observable at downstream logic via the Q pin.

Figure 2:
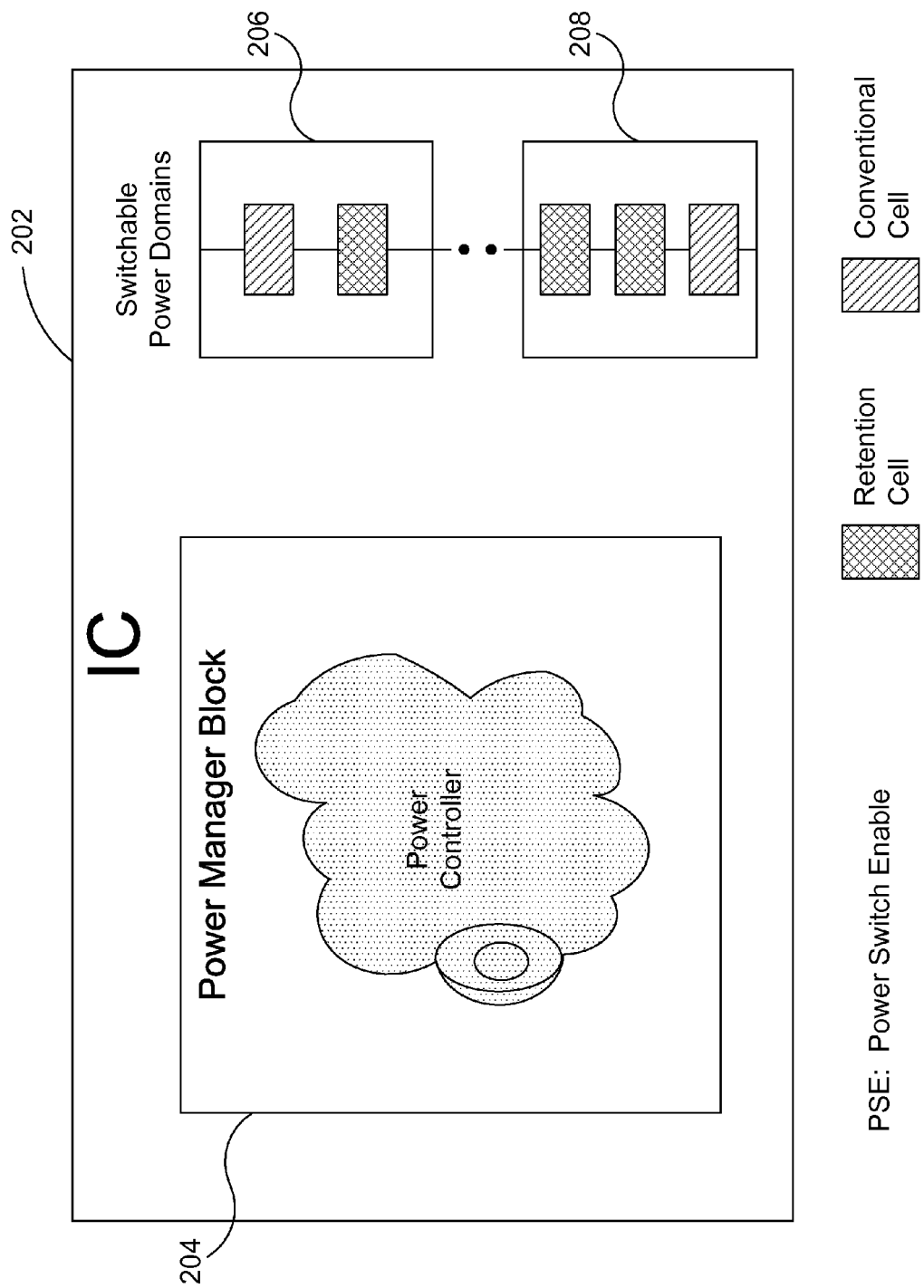
FIG. 2 shows an exemplary arrangement of power domains.

For example, FIG. 2 shows an exemplary IC 202 with power controls for multiple power domains. The IC 202 includes a power manager block 204 that controls (or switches) a first power domain 206 and a second power domain 208 by separate controls (PSE_1, PSE_2). The power domains 206, 208 each include retention cells and conventional cells (e.g., flops).

The retention cell 102 can be tested by performing test generation for structural defects and treating the cell as any other logic within the chip. Some examples of structural defects are pin QB on Flop B 106 being incorrectly connected to the ground rail, output pin of MUX2 being connected to the power rail, etc. A typical structural testing approach would be to make flop A 104 in FIG. 1 part of a scan chain while flop B 106 would be treated as a non-scan flop. Validation of scan architectures typically includes scan testing to verify that values are correctly stored in each element of the chain. Scan testing can be further developed for scan chains that include retention cells by incorporating power-cycling into the process. See, for example, U.S. patent application Ser. No. 12/147,128, "Testing State Retention Logic in Low Power Systems," filed Jun. 26, 2008, which is incorporated herein by reference in its entirety.

When circuit values are accessible (e.g., via scan chains), common pattern fault models like stuck-at and transition faults can be used to estimate coverage of defects. For example, the manufacturing defects mentioned earlier would be similar to pin QB having a stuck-at-0 fault and output pin of MUX2 having a stuck-at-1 fault. These faults related to manufacturing defects are also called static faults while faults that involve timing delays are called dynamic faults. See, for example, U.S. Pat. No. 5,546,408, "Hierarchical Pattern Faults for Describing Logic Circuit Failure Mechanisms," issued Aug. 13, 1996, which is incorporated herein by reference in its entirety.

FIG. 3 shows exemplary syntax for a static pattern fault 302 and a dynamic pattern fault 304. A static pattern fault 302 includes a specification of the conditions required to activate the fault, and the origin of the fault effect. These specifications are in terms of nets and/or pins in the logic which are required to be at a specified value, and the propagation of the fault effect. The static pattern fault syntax 302 specifies a set of REQUIRED net values to excite the defect and a single PROPAGATION net value to identify the net where the effect of the defect first appears. A dynamic pattern fault 304 includes a specification of a set of INITIAL net values and a set of REQUIRED net values, which together identify the nets which must go through a specific value change (transition), and a PROPAGATION net value to identify the net where the effect of the defect first appears.

Figure 4:
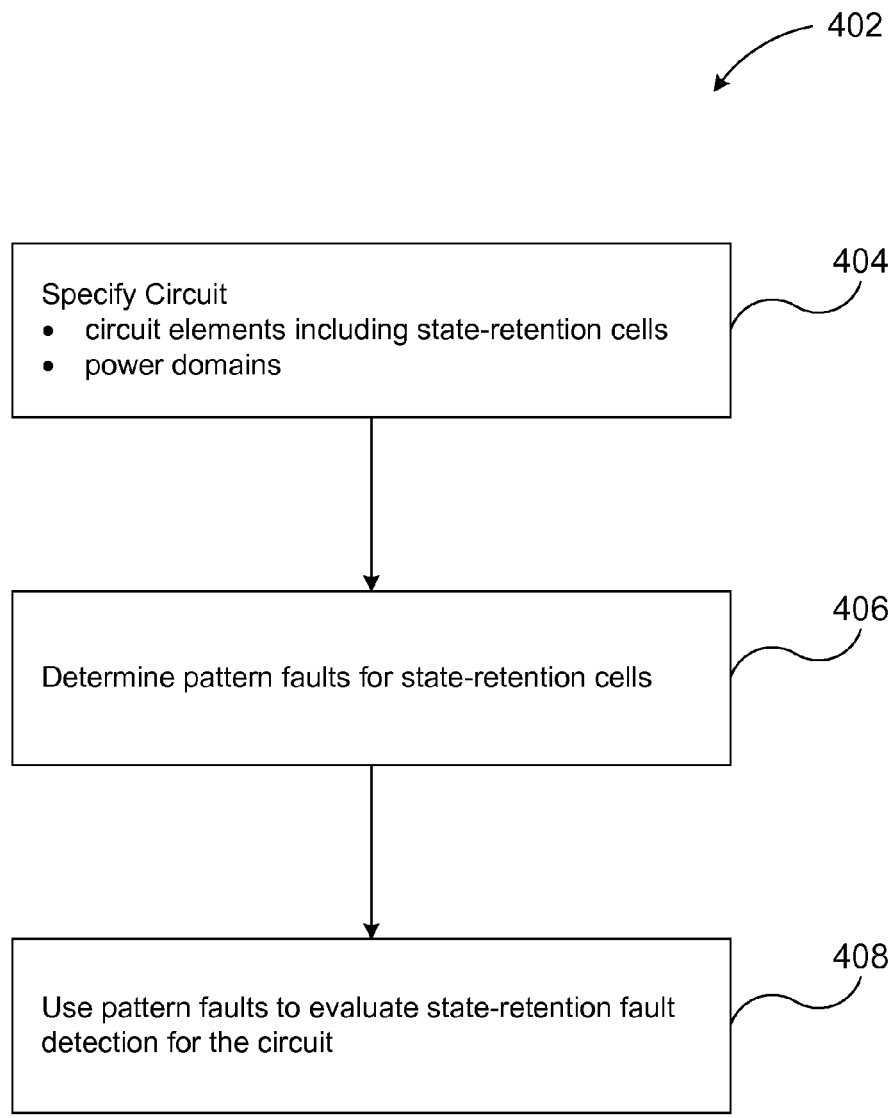
FIG. 4 shows a method of modeling defective state-retention behavior in a circuit according to an embodiment of the present invention.

However, conventional pattern faults do not encompass the behavior of retention cells 102. FIG. 4 shows an embodiment of the present invention where pattern faults are employed to model defective behavior of circuits with one or more retention cells. A method of modeling defective state-retention behavior in a circuit 402 includes specifying circuit elements including one or more state retention cells and specifying an arrangement of power domains for the circuit elements 404. The method then includes determining pattern faults for the state-retention cells 406 and using the pattern faults to evaluate state-retention fault detection the circuit 408. Pattern faults that model the failed retention behavior enable the fault grading of functional patterns that power down and power up the domains containing retention flops to check their retention capabilities.

Figure 5:
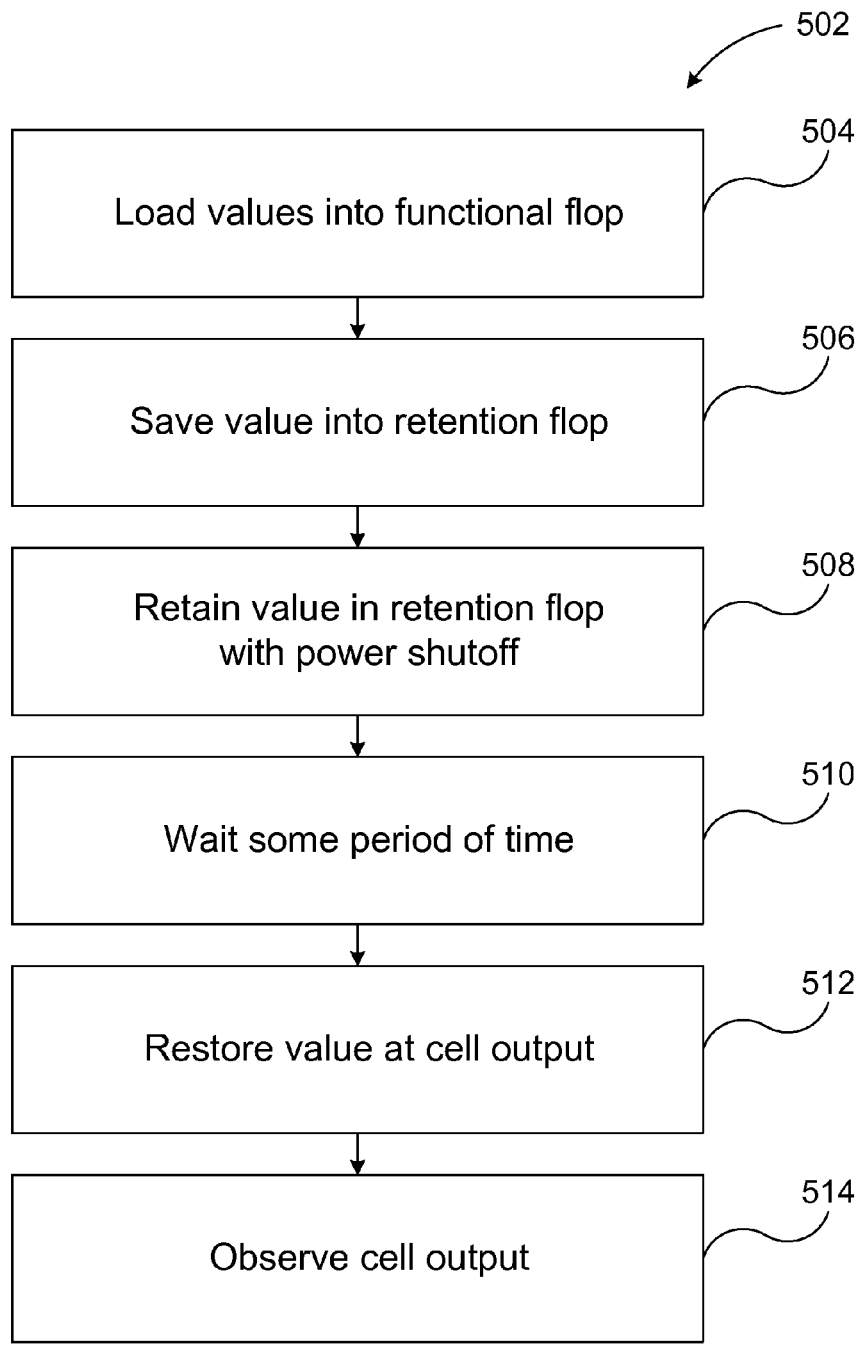
FIG. 5 shows method of testing defective retention behavior in a circuit according to an embodiment of the present invention.

In general, failed behavior of a retention cell can be characterized by failure of one of three functions: save, retain, and restore. FIG. 5 shows a method 502 according to the present invention for using these functions for testing defective retention behavior of a retention cell 102, that includes a functional flop 104 and a retention flop 106. (In some retention design styles as discussed below, the functional flop may also serve as the retention flop that holds state during power down.) For a saved value of 0 and a saved value of 1 the following steps are carried out. First, load a value into the functional flop within the retention cell 504. Then, in the case where the cell contains a retention flop that is separate from the functional flop, save the value in the functional flop into the retention flop 506. (It is also possible that both the functional flop and the retention flop may get loaded in parallel.) Then retain the value in retention flop while shutting off power to the power domain to which the retention flop belongs 508. Then wait some period of time (optionally exercise logic within domains that are not powered off) and then turn power back on to the power domain containing the retention cell 510. Then make the retained value visible at the retention cell output by doing a restore operation 512. Then observe the cell output (e.g., by ensuring that the retention cell output is observable at a scan cell or a primary output) 514.

By modeling faulty save, retain, and restore operations by pattern faults, test patterns can be fault graded against the pattern faults to see if retention behavior defects can be detected. As discussed below, modeling these behaviors depends on the specific details of the retention-cell styles, and the disclosed embodiments can be modified accordingly for a different retention-cell First, the retention-cell style illustrated in FIG. 1 will be considered where a retention cell 102 includes a functional flop 104 and retention flop 106.

The save operation ensures that the retention flop is loaded with the value to be retained, and this should happen through the logic meant for the save process. For example, the retention flop's attaining the state of logic-0 because of its reset pin being activated does not count as conforming to the save process. The pattern fault mechanism allows a means to detect failures when the retention flop is not loaded through a proper save operation. The save operation could mean that a clock pulse is required to load the retention flop with the value in the main functional flop. A clock pulse would also be required in the case where both the retention flop and functional flop are loaded in parallel.

FIG. 6 shows a template for a dynamic pattern fault for modeling the save operation for the retention cell 102 of FIG. 1. Since the save operation involves a clock, a dynamic pattern fault is used. The INITIAL values include values for the Save_data pin and the functional flop output (0 in this case). The REQUIRED values include values for the Save_data pin and deactivating the set (or reset) pin. The PROPAGATION values include values for the retention flop output (0/1 for correct/incorrect in this case). The example assumes the Save_data signal captures data into the retention flop on the rising edge, and the data to be saved and restored is logic-0. For logic-1, the template will be same except for the data value.

FIG. 7 shows a template for a static pattern fault for modeling the retain operation for the retention cell 102 of FIG. 1. The REQUIRED values include values for the retention flop output (0 in this case) and the power-off signal for the corresponding power domain. The PROPAGATION values include values for the retention flop output (0/1 for correct/incorrect in this case). The domain_power_signal is the signal in the chip that indicates whether the parent domain containing the retention cell is powered on or off (e.g., PSE_1 or PSE_2 in FIG. 2). Note that there could be multiple such signals for a power domain. The signal could come either from the on-chip power controller or from any design-for-test logic that controls the power domains during manufacturing test.

Note that this retain pattern fault will be marked as detected by a test pattern only if the test pattern contains the sequence to power down the parent domain containing the retention cell. During manufacturing test, if the pattern fault above is detected by a test pattern, it indicates that the retention cell is unable to retain its value once the domain has been powered down.

Note further that this retain pattern fault has been specified using a power enable signal that exists outside the retention cell itself. This results in two retain pattern faults to be coded up for each retention instance in the design, which can become too cumbersome to be done manually and would require automation of pattern fault generation. Another alternative could be, when available, to use a pin on the retention cell that indicates when power to the retention cell has been switched off. If such a pin is available, it could be used to significantly reduce the number of retain pattern faults to be coded manually since the pattern faults can be coded up only for each retention-cell definition, which then gets replicated for each instance of that retention cell in the design.

In general, the restore operation does not need to be modeled explicitly since restore has to happen in order for the good/faulty value of the save and retain pattern faults to be observable. When fault grading test patterns against the above pattern faults, the fault simulator will not mark the save and retain pattern faults as detected unless their fault effect is observable at either a scan flop or primary output. In order for the fault effect to be observable, the test pattern must contain the restore operation after the save and retain operations.

These save and retain pattern faults (FIGS. 6-7) can be applied to validate the IC design by covering each retention cell. To ensure that each retention cell can save and restore both a logic-0 and logic-1 value, two save and two retain pattern faults are required to test that both values work.

The pattern fault for save ensures that the retention cell can be loaded properly with the value to be retained, and the pattern fault for retain ensures that the retention cell holds state during power down. When testing for the retain pattern fault, there is no need to worry about how the value to be retained got there. When testing for the save pattern fault, there is no need to test whether the saved value is being retained. Both these pattern faults are independently testing separate behavior, but the combination of both robustly ensures that the retention capability is functioning correctly. When fault grading test patterns against the set of pattern faults for all retention cells in the design, both the pattern faults for a retention cell must be detected in order to qualify the test patterns as detecting faulty state retention behavior of the retention cell.

The save pattern fault described above needs to be correlated against the retention cell in the design. The containing block to which this pattern fault applies is a retention cell. All instances of that retention cell in the design will have the save pattern fault marked against them. This allows the fault simulator to mark whether the pattern fault for a retention-cell instance is detected by a test pattern or not. The advantage of applying the pattern fault against the retention cell definition is that by specifying the pattern fault only once, it gets applied to all instances of that cell definition.

The retain pattern fault involves a pin within the retention cell and a pin for a power signal present in some other hierarchy in the design. The containing block to which this pattern fault applies is a level within the design where both signals are visible. The pattern fault will then have to use the full hierarchical name for the pin within a retention-cell instance and for the power signal. The disadvantage here is that a separate retain pattern fault has to be written for each retention-cell instance in the design.

FIG. 8 shows an embodiment directed towards relieving the need for patterns faults to be coded separately for each retention-cell instance by enhancing the pattern fault syntax itself to include a rule for generating pattern faults. In this case the pattern fault 802 references a global variable that will be assigned a value outside the pattern fault according to a format 804. For example, this syntax could support a new keyword called VAR that defines a variable whose value will be filled in at a later time.

This approach allows the pattern fault to be defined against the retention cell, and then all instances of the retention cell will get the same pattern fault. The hierarchical instance (or domain) in the design that contains the power enable signal for the retention cells within that hierarchy can have the property tagged against it as shown by the given format 804. When the pattern faults are processed, the <signal_variable> within the pattern fault for the retention-cell instance will get filled in with the value obtained from the property above. Each retention-cell instance will get a value for <signal_variable> depending on which hierarchy it is contained within. In short, the VAR keyword in the pattern fault syntax acts as a placeholder that will get filled in with the value determined from the property placed on the hierarchy containing that instance. There could be multiple VAR statements within the same pattern fault, each referencing different variables.

This syntax 802, 804 allows two instances of the same retention cell to have different power enable signals as specified by using the property PATTERN_FAULT_VAR on the hierarchy containing that retention-cell instance. However, only one pattern fault needs to be coded up for the retention cell, and that pattern fault gets applied to both instances.

Figure 9:
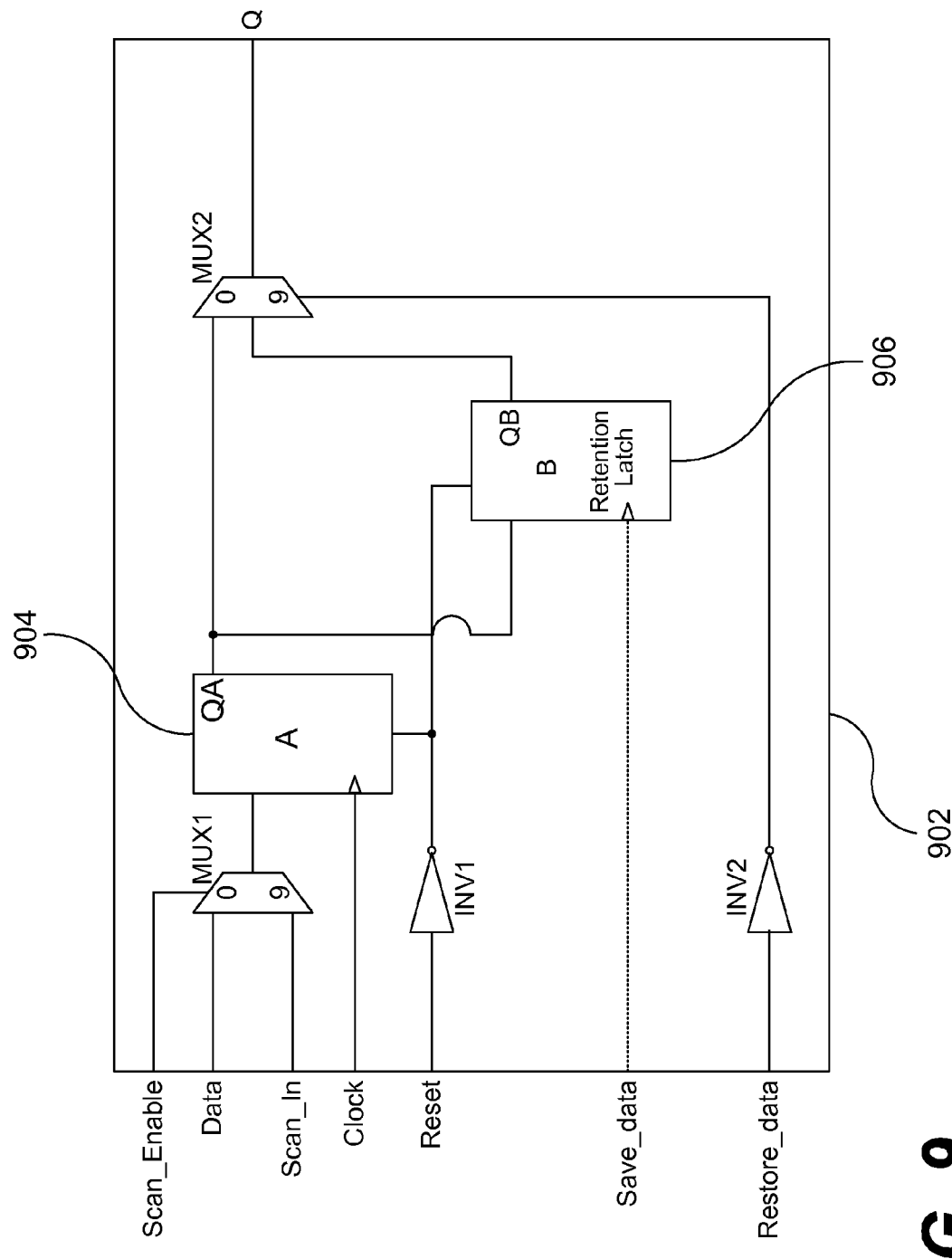
FIG. 9 shows an exemplary state retention cell (or SRPG cell) with a flop and a latch.

As discussed above, alternative design styles are possible in addition to the retention-cell 102 shown in FIG. 1. FIG. 9 shows a retention cell 902 that includes a functional flop 902 and other features similar to the design in FIG. 1. However, this retention cell 902 includes a retention latch 906 (instead of a retention flop 106). FIG. 10 shows a static pattern fault for the save operation. The REQUIRED values include values for the save signal so that the latch is in a "flush" state, the functional flop output (0 in this case) and deactivating the set (or reset) pin. The PROPAGATION values include values for the retention latch output (0/1 for correct/incorrect in this case). FIG. 11 shows a static pattern fault for the retain operation. The REQUIRED values include values for the retention latch output (0 in this case) and the power-off signal for the corresponding power domain. The PROPAGATION values include values for the retention latch output (0/1 for correct/incorrect in this case).

Figure 12:
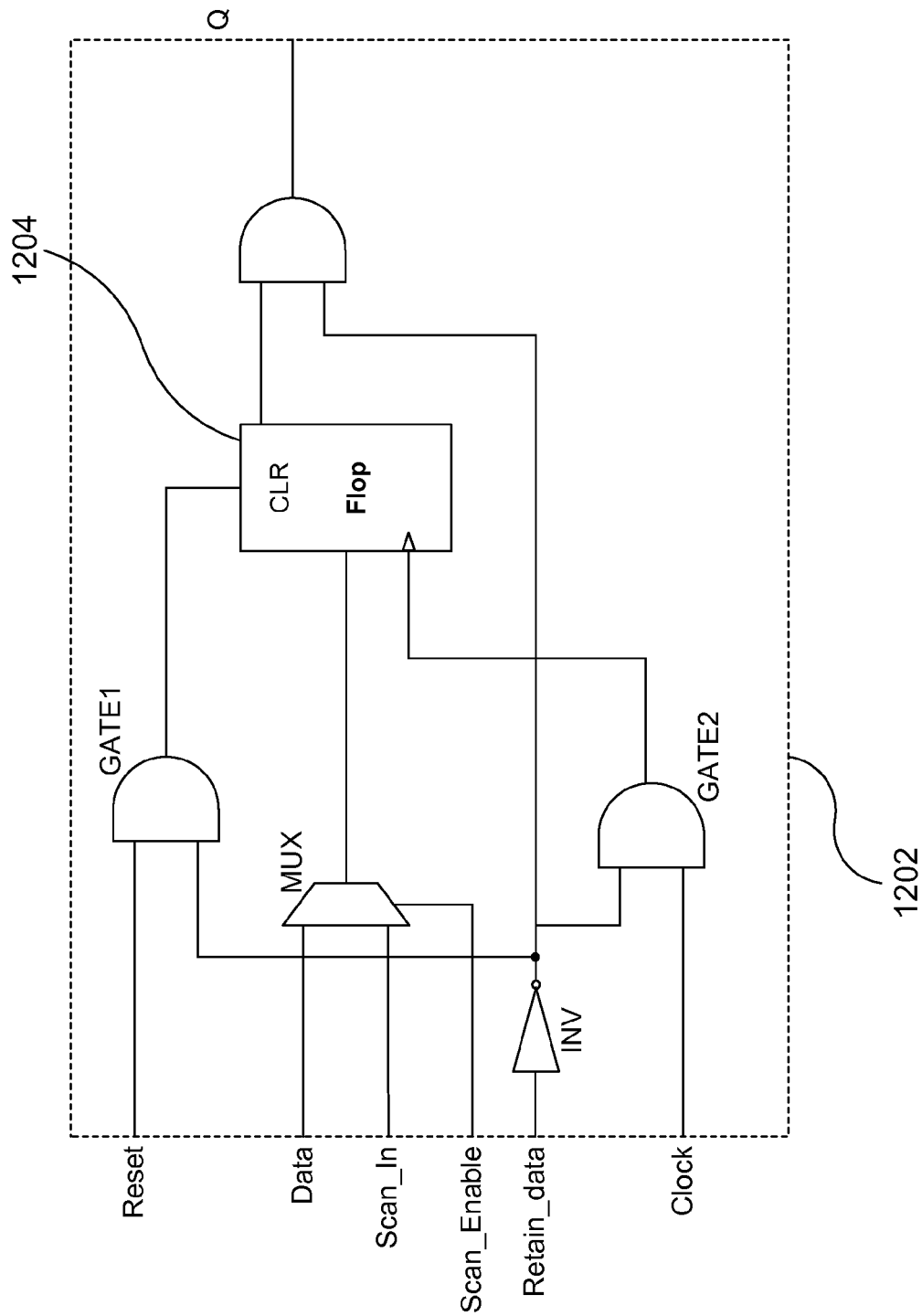
FIG. 12 shows an exemplary state retention cell (or SRPG cell) with a single flop.

FIG. 12 shows a retention-cell design 1202 with a single retention control signal Retain_data and a single flop 1204 that functions both as a functional flop as well as a retention node. The retention cell includes one multiplexer (MUX), one inverter (INV), and two and gates (GATE1 and GATE2). The multiplexer MUX controls whether the flop 1204 gets data from the functional path (through pin Data) or from the previous flop in the scan chain (through pin Scan_In). When pin Scan_Enable is at logic-0 value, the flop is on the functional path (Data-Q) and when Scan_Enable is at logic-1 value the flop is on the scan path (Scan_In-Q). The Retain_data pin would typically be at logic-0 unless the domain is powered down, in which case Retain_data would be at a logic-1 so that it blocks the clocks from triggering and changing the value of the flop. When Retain_data is at logic-1 the flop will hold state and depending on the actual implementation, the Q pin will see an X or a constant value. When the domain is powered back on Retain_data will be back at a logic-0 to allow the value in flop to be visible at the Q pin of the retention cell.

The pattern faults for the retention cell in FIG. 12 are analogous to those for the retention cell in FIG. 1. However, there is no separate retention flop for holding the state. The functional flop is part of the logic that is always powered on, and is used to perform retention in addition to being a functional and scan flop. In reality the slave latch within this flop is always powered on, and retains state even though the master latch is powered off. Also in this case, the save pattern fault does not depend on where the data to be saved comes from. It could come from either the scan load or by a reset. It is sufficient to ensure that the data loaded into the flop is the value to be saved and later restored. FIG. 13 shows a static pattern fault for the save operation. The REQUIRED values include values for the flop output (0 in this case). The PROPAGATION values include values for the retention flop output (0/1 for correct/incorrect in this case). FIG. 14 shows a static pattern for the retain operation. The REQUIRED values include values for the flop output (0 in this case) and the power-off signal for the corresponding power domain. The PROPAGATION values include values for the retention flop output (0/1 for correct/incorrect in this case).

Additional embodiments relate to an apparatus for carrying out any one of the above-described methods, where the apparatus includes a computer for executing computer instructions related to the method. In this context the computer may be a general-purpose computer including, for example, a processor, memory, storage, and input/output devices (e.g., keyboard, display, disk drive, Internet connection, etc.). However, the computer may include circuitry or other specialized hardware for carrying out some or all aspects of the method. In some operational settings, the apparatus may be configured as a system that includes one or more units, each of which is configured to carry out some aspects of the method either in software, in hardware or in some combination thereof.

At least some values for the results of the method can be saved by the apparatus, either in memory (e.g., RAM (Random Access Memory)) or permanent storage (e.g., a hard-disk system) for later use. For example the pattern faults can be saved for later testing or analysis. Alternatively, some derivative or summary form of the results (e.g., statistics for fault coverage) can be saved for later use according to the requirements of the operational setting.

Additional embodiments also relate to a computer-readable medium that stores (e.g., tangibly embodies) a computer program for carrying out any one of the above-described methods by means of a computer. The computer program may be written, for example, in a general-purpose programming language (e.g., C, C++) or some specialized application-specific language. The computer program may be stored as an encoded file in some useful format (e.g., binary, ASCII).

Although only certain exemplary embodiments of this invention have been described in detail above, those skilled in the art will readily appreciate that many modifications are possible in the exemplary embodiments without materially departing from the novel teachings and advantages of this invention. For example, aspects of embodiments disclosed above can be combined in other combinations to form additional embodiments. Accordingly, all such modifications are intended to be included within the scope of this invention.

What is claimed is:

1. A method of characterizing defects in state-retention logic, comprising:
   specifying a circuit that includes an arrangement of circuit elements, wherein
      a portion of the circuit is organized into a power domain with a power-domain control for effecting power variations within the power domain, and
      the power domain includes a state-retention cell that includes a retention element with a retention-element control for saving state-retention-cell values in the retention element during power variations in the power domain;

specifying a defect that corresponds to an incorrect functioning of the state-retention cell in a state-retention operation of the circuit;

using a computer for determining one or more pattern faults for detecting the defect in the state-retention operation of the circuit by associating circuit element values with values for the power-domain control or the retention-element control, wherein the one or more pattern faults include required circuit-element values for activating the defect in the state-retention operation of the circuit and propagation circuit-element values for detecting a presence or absence of the defect in the state-retention operation of the circuit; and saving one or more values for the one or more pattern faults.

2. A method according to claim 1, wherein
the one or more pattern faults include a static pattern fault.

3. A method according to claim 1, wherein
the one or more pattern faults include a dynamic pattern fault that includes initial circuit-element values for initializing conditions for the defect in the state-retention operation of the circuit, the incorrect functioning of the state-retention cell including a transition from the initial circuit-element values to the required circuit-element values.

4. A method according to claim 1, wherein
the defect corresponds to the incorrect functioning of the state-retention cell in saving the state-retention-cell values, and the one or more pattern faults include a dynamic pattern fault comprising:
  initial values for the state-retention cell and the retention-element control for initializing conditions for the defect,
  required values for the retention-element control for activating the defect, and
  propagation values for the retention element for detecting a presence or absence of the defect.

5. A method according to claim 1, wherein
the defect corresponds to the incorrect functioning of the state-retention cell in saving the state-retention-cell values, and the one or more pattern faults include a static pattern fault comprising:
  required values for the state-retention cell and the retention-element control for activating the defect, and
  propagation values for the retention element for detecting a presence or absence of the defect.

6. A method according to claim 1, wherein
the defect corresponds to the incorrect functioning of the state-retention cell in saving the state-retention-cell values, and the one or more pattern faults include a static pattern fault comprising:
  required values for the retention element for activating the defect, and
  propagation values for the retention element for detecting a presence or absence of the defect.

7. A method according to claim 1, wherein
the defect corresponds to the incorrect functioning of the state-retention cell in retaining the state-retention-cell values, and the one or more pattern faults include a static pattern fault comprising:
  required values for the retention element and the power domain control for activating the defect, and
  propagation values for the retention element for detecting a presence or absence of the defect.

8. A method according to claim 1, further comprising:
associating keywords with the retention-element control and the power-domain control; and
using the keywords to determine one or more additional pattern faults corresponding to a replication of the state-retention cell in a second power domain of the circuit having a corresponding second power-domain control, the one or more additional pattern faults characterizing the defect for the replicated state-retention cell in the state-retention operation of the circuit.

9. A method according to claim 1, further comprising
generating test patterns for testing the circuit; and
using the one or more pattern faults to determine whether the test patterns are sufficient for detecting the defect in the state-retention operation of the circuit.

10. A method according to claim 1, wherein the defect includes at least one of:
  a pin of the state-retention cell being incorrectly connected to a power rail or a ground rail; or
  a pin of the state-retention cell being stuck at a value.

11. A method according to claim 1, further comprising:
verifying that the propagation circuit-element values are observable in the state-retention operation of the circuit though a scan-chain output or a primary output.

12. A method according to claim 1, further comprising:
generating test patterns for testing the circuit;
using the one or more pattern faults to determine whether the test patterns are sufficient for detecting the defect in state-retention operation of the circuit; and
verifying that the propagation circuit-element values corresponding to the one or more pattern faults are observable in the state-retention operation of the circuit though a scan-chain output or a primary output.

13. A method according to claim 1, wherein the one or more pattern faults include:
  a save-operation pattern fault for detecting a saving of the state-retention-cell values independently of whether the state-retention-cell values are retained in the state-retention operation of the circuit; and
  a retain-operation pattern fault for detecting a retaining of the state-retention-cell values independently of whether the state-retention-cell values are saved in the state-retention operation of the circuit.

14. A method according to claim 1, wherein
the required circuit-element values include values for a first location of the circuit for activating the defect, and
the propagation circuit-element values include values for a second location of the circuit for detecting the presence or absence of the defect, the second location being different from the first location.

15. A computer-readable non-transitory medium that stores a computer program for characterizing defects in state-retention logic, wherein the computer program includes instructions for:
  specifying a circuit that includes an arrangement of circuit elements, wherein
    a portion of the circuit is organized into a power domain with a power-domain control for effecting power variations within the power domain, and
    the power domain includes a state-retention cell that includes a retention element with a retention-element control for saving state-retention-cell values in the retention element during power variations in the power domain;

specifying a defect that corresponds to an incorrect functioning of the state-retention cell in a state-retention operation of the circuit;

using a computer for determining one or more pattern faults for detecting the defect in the state-retention operation of the circuit by associating circuit element values with values for the power-domain control or the retention-element control, wherein the one or more pattern faults include required circuit-element values for activating the defect in the state-retention operation of the circuit and propagation circuit-element values for detecting a presence or absence of the defect in the state-retention operation of the circuit; and saving one or more values for the one or more pattern faults.

16. A computer-readable medium according to claim 15, wherein the one or more pattern faults include a static pattern fault.

17. A computer-readable medium according to claim 15, wherein the one or more pattern faults include a dynamic pattern fault.

the one or more pattern faults include a dynamic pattern fault that includes initial circuit-element values for initializing conditions for the defect in the state-retention operation of the circuit, the incorrect functioning of the state-retention cell including a transition from the initial circuit-element values to the required circuit-element values.

18. A computer-readable medium according to claim 15, wherein the defect corresponds to the incorrect functioning of the state-retention cell in saving the state-retention-cell values, and the one or more pattern faults include a dynamic pattern fault comprising:

initial values for the state-retention cell and the retention-element control for initializing conditions for the defect, required values for the retention-element control for activating the defect, and propagation values for the retention element for detecting a presence or absence of the defect.

19. A computer-readable medium according to claim 15, wherein the defect corresponds to the incorrect functioning of the state-retention cell in saving the state-retention-cell values, and the one or more pattern faults include a static pattern fault comprising:

required values for the state-retention cell and the retention-element control for activating the defect, and propagation values for the retention element for detecting a presence or absence of the defect.

20. A computer-readable medium according to claim 15, wherein the defect corresponds to the incorrect functioning of the state-retention cell in saving the state-retention-cell values, and the one or more pattern faults include a static pattern fault comprising:

required values for the retention element for activating the defect, and propagation values for the retention element for detecting a presence or absence of the defect.

21. A computer-readable medium according to claim 15, wherein the defect corresponds to the incorrect functioning of the state-retention cell in retaining the state-retention-cell values, and the one or more pattern faults include a static pattern fault comprising:

required values for the retention element and the power domain control for activating the defect, and propagation values for the retention element for detecting a presence or absence of the defect.

22. A computer-readable medium according to claim 15, wherein the computer program further includes instructions for:

associating keywords with the retention-element control and the power-domain control; and using the keywords to determine one or more additional pattern faults corresponding to a replication of the state-retention cell in a second power domain of the circuit having a corresponding second power-domain control, the one or more additional pattern faults characterizing the defect for the replicated state-retention cell in the state-retention operation of the circuit.

23. A computer-readable medium according to claim 15, wherein the computer program further includes instructions for:

generating test patterns for testing the circuit; and using the one or more pattern faults to determine whether the test patterns are sufficient for detecting the defect in the state-retention operation of the circuit.

24. An apparatus for characterizing defects in state-retention logic, the apparatus comprising a computer for executing computer instructions, wherein the computer includes computer instructions for:

specifying a circuit that includes an arrangement of circuit elements, wherein a portion of the circuit is organized into a power domain with a power-domain control for effecting power variations within the power domain, and the power domain includes a state-retention cell that includes a retention element with a retention-element control for saving state-retention-cell values in the retention element during power variations in the power domain;

specifying a defect that corresponds to an incorrect functioning of the state-retention cell in a state-retention operation of the circuit;

determining one or more pattern faults for detecting the defect in the state-retention operation of the circuit by associating circuit element values with values for the power-domain control or the retention-element control, wherein the one or more pattern faults include required circuit-element values for activating the defect in the state-retention operation of the circuit and propagation circuit-element values for detecting a presence or absence of the defect in the state-retention operation of the circuit; and saving one or more values for the one or more pattern faults.

25. An apparatus according to claim 24, wherein the computer includes a processor with memory for executing at least some of the computer instructions.

26. An apparatus according to claim 24, wherein the computer includes circuitry for executing at least some of the computer instructions.

* * * * *